(12) United States Patent
Dwyer et al.

(10) Patent No.: US 7,380,454 B2
(45) Date of Patent: Jun. 3, 2008

(54) LOAD BEAM FOR SURFACE ACOUSTIC WAVE ACCELEROMETER

(75) Inventors: Paul W. Dwyer, Seattle, WA (US); Stephen F. Becka, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 11/313,892

(22) Filed: Dec. 20, 2005

(65) Prior Publication Data

US 2007/0137300 A1 Jun. 21, 2007

(51) Int. Cl.
*G01P 15/08* (2006.01)
(52) U.S. Cl. .................... 73/514.28; 73/514.16
(58) Field of Classification Search .......... 73/514.28, 73/514.16, 514.18, 514.21; 310/313 D, 313 R
See application file for complete search history.

(56) References Cited

U.S. PATENT DOCUMENTS

| 4,346,597 | A | | 8/1982 | Cullen | |
|---|---|---|---|---|---|
| 4,467,235 | A | * | 8/1984 | De Wames et al. | 310/313 D |
| 4,676,104 | A | * | 6/1987 | Cullen | 73/514.12 |
| 4,920,801 | A | * | 5/1990 | Church | 73/514.16 |
| 5,225,705 | A | * | 7/1993 | Hiyama et al. | 257/415 |
| 5,365,770 | A | * | 11/1994 | Meitzler et al. | 73/24.06 |
| 6,553,836 | B2 | | 4/2003 | Williams | |

FOREIGN PATENT DOCUMENTS

| GB | 2117115 | * | 10/1983 |
|---|---|---|---|
| JP | 60-56262 | * | 4/1985 |
| JP | 10-221360 | * | 8/1998 |

* cited by examiner

*Primary Examiner*—Helen C. Kwok
(74) *Attorney, Agent, or Firm*—Black Lowe & Graham Pllc

(57) ABSTRACT

Methods and systems for forming accelerometers include forming a load beam supported at one end having an input interdigital transducer (IDT) and an output IDT. The load-beam has a cross section varying in the longitudinal direction effective to cause the load beam to deflect radially in response to an applied load. The cross section varies in width, height, or both.

20 Claims, 4 Drawing Sheets

LOAD BEAM FOR SURFACE ACOUSTIC WAVE ACCELEROMETER

BACKGROUND OF THE INVENTION

Surface acoustic wave (SAW) devices are a well known sensing means with many applications including use as accelerometers. A typical SAW device operates by measuring changes in the speed of acoustic waves propagating through the surface of a structure. Speed is measured by exciting a wave at one point on a structure and sensing its arrival at another point. Speed is also measured by measuring a resonating frequency at which a standing wave arises in a structure.

In one common SAW device, one or more interdigital transducers (IDT) are attached to a structure formed of a piezoelectric material, such as quartz, spaced apart from one another. An electrical signal is input into the transducers, which causes a surface acoustic wave due to the piezoelectric properties of the structure. A standing wave is created within the structure, the frequency of which varies with the strain in the structure. The resonating frequency is measured by an oscillator connected to the transducer and is used to calculate the force exerted on the structure.

An IDT is typically formed by two conductive patterns each having a series of fingers extending perpendicular to the direction of travel of the measured wave. The fingers of the two conductive patterns are interlaced, such that any locally excited voltage will result in a voltage difference between the two patterns.

SAW accelerometers detect strains in a load beam that result from inertial forces exerted on a load beam by a proof mass, or the mass of the load beam itself. In some materials, such as quartz, the speed of waves within the material increases with increasing strain on the material. Accordingly, increases in the speed of surface waves or increases in a resonating frequency of surface waves can be mapped to increases in acceleration.

Constant cross section beams as used in prior systems typically deflect parabolically such that the amount of strain in the load beam varies with position along the load beam. This results in unequal changes in the distance between the fingers of the IDT. The unequal spread of the fingers results in the detection of a wide band of frequencies, rather a single frequency, or narrower band of frequencies.

Unequal strain also causes unequal changes in propagating speed along the load beam. This in turn widens the band of frequencies at which standing waves will develop in the load beam. The resonating frequency in the load beam is measured by an oscillator that will tend to jump among the frequencies present in the IDT resulting in noise. Where a wide band of frequencies is present, the magnitude of the noise is greater.

The output of SAW accelerometers is often integrated to calculate the velocity and position of a vehicle. Any noise or inaccuracies in the output of an accelerometer will therefore be compounded by the integration calculation resulting in erroneous navigational data. It would therefore be an advancement in the art to provide a means for improving the accuracy of SAW accelerometers.

BRIEF SUMMARY OF THE INVENTION

The present invention provides methods and systems for improving accuracy of a SAW accelerometer. One method includes forming a load beam having a cross section varying in the longitudinal axis such that the load beam deflects radially in response to an applied load. IDTs secure to one or more surfaces of the load beam. The cross section is chosen to provide radial deflection in response to a point load positioned at the free end of the load beam or a distributed load extending along the length of the load beam. Radial deflection promotes equal strain along the length of the load beam, ensuring that any increase in the distance between elements, such as fingers forming the IDT, caused by the strain is proportional to the force exerted on the load beam 12. In this manner, bias errors caused by the increase in distance are reduced.

In one embodiment, a cross section providing radial deflection is formed by contouring one or both of the lateral sides of the load beam to vary the width of the load beam. Such contouring may be performed by photolithography, deep ion etching, or the like. In other embodiments, the cross section is varied by contouring one or both of the top and bottom sides using magnetorheological finishing (MRF) or a diamond saw.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
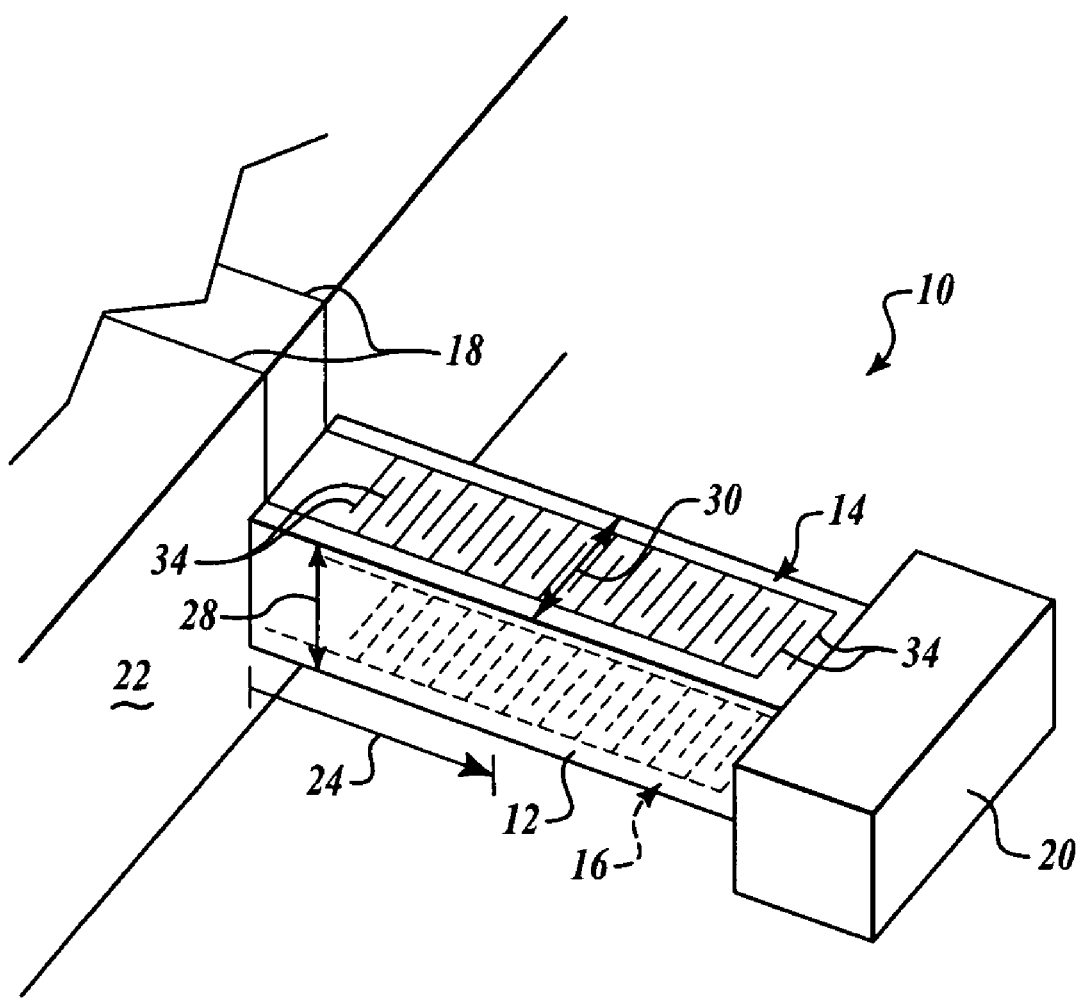
FIG. 1 is a perspective view of a SAW accelerometer, in accordance with an embodiment of the present invention.

Referring to FIG. 1, a surface acoustic wave (SAW) accelerometer 10 includes a load beam 12 having a transducer 14 on a top surface thereof. In some embodiments, a second transducer 16 secures to the lower surface of the load beam 12. Lead lines 18 connect the transducers 14, 16 to a signal processing circuit (not shown). A proof mass 20 secures to the free end of the load beam 12. Alternatively, the proof mass 20 is omitted and inertial forces exerted on the load beam 12 itself cause stress within the load beam 12. The load beam 12 secures to a support structure 22, such as a block of quartz with which the load beam 12 is monolithically formed.

Figure 2:
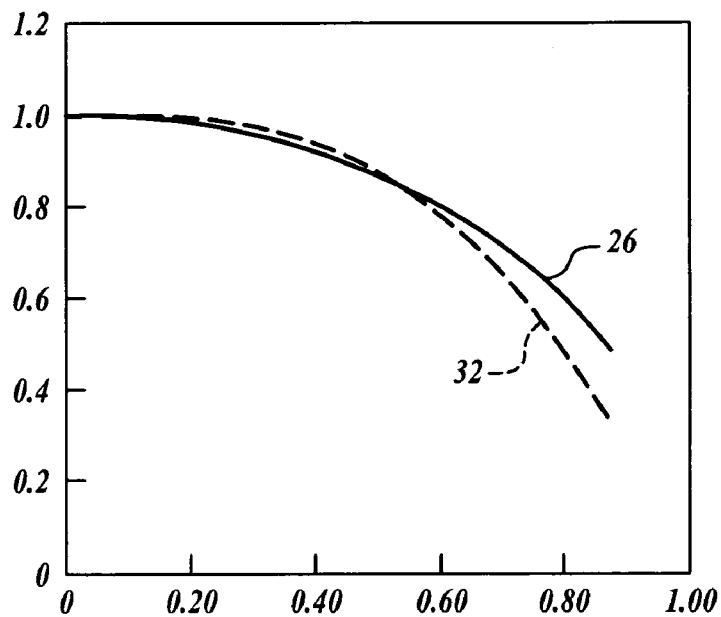
FIG. 2 is a plot of deflection of prior art load beams and deflection of load beams formed in accordance with an embodiment of the present invention.

Referring to FIG. 2, while still referring to FIG. 1, the cross section of the load beam 12 varies with distance 24 from the support structure 22 such that the beam deflects radially, approximating a circular arc, as illustrated by curve 26. The cross section may vary in height 28, width 30, or both. Variations in the height and width may be accomplished by contouring one or more sides of the load beam 12. Constant cross section beams as used in prior systems typically deflect parabolically as shown by curve 32. It is readily apparent that the amount of strain in curve 32 varies with position along the load beam 12, whereas curve 26 has substantially constant strain along its length.

The present invention provides radial deflection of the load beam, resulting in substantially uniform strain along the load beam 12. Substantially uniform strain along the load beam 12 ensures that any increase in separation between a plurality of fingers 34 forming the IDTs 14, 16 is proportional to the force exerted on the load beam. This promotes accuracy inasmuch as variation introduced by the increase in separation is proportional to the measured variable. The substantially equal strain along the length of the beam also reduces noise by narrowing the band of resonating frequencies in the load beam 12 such that an oscillator detecting the resonating frequency will jump within a smaller band of frequencies.

Figure 3:
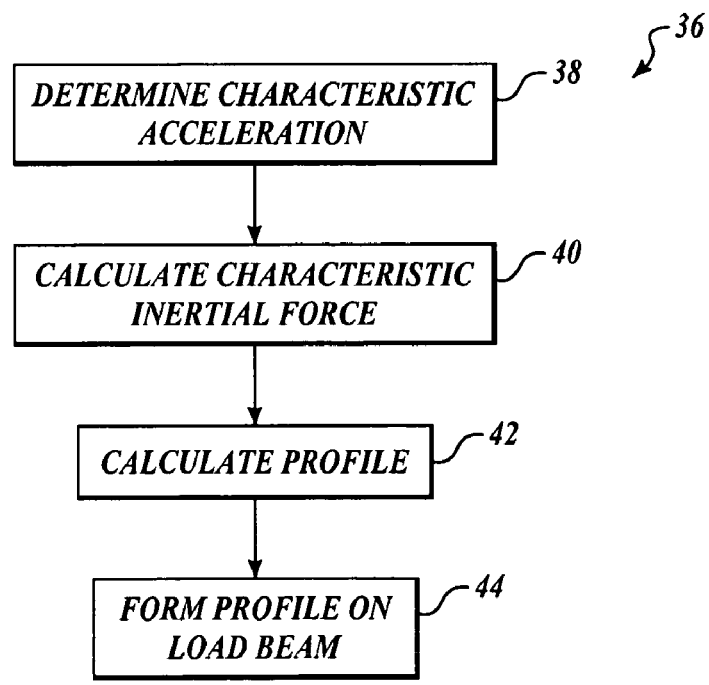
FIG. 3 is a process flow diagram of a method for forming a load beam, in accordance with an embodiment of the present invention.

FIG. 3 illustrates a method 36 for forming a load beam 12 having radial deflection. At block 38, the characteristic acceleration for the accelerometer 10 is determined. The characteristic acceleration may be the maximum, average, or most likely acceleration to which the accelerometer is subject. In some embodiments, multiple accelerometers are used each having a different characteristic acceleration such that each will have radial deflection at a different point along the range of accelerations to which the accelerometers 10 will be subject.

At block 40, an inertial force exerted on the load beam 12 at the determined characteristic acceleration is determined. At block 42, a load beam profile achieving radial deflection under the characteristic inertial force is calculated. At block 44, the profile of the load beam 12 is formed according to the profile calculated at block 42.

Figure 4:
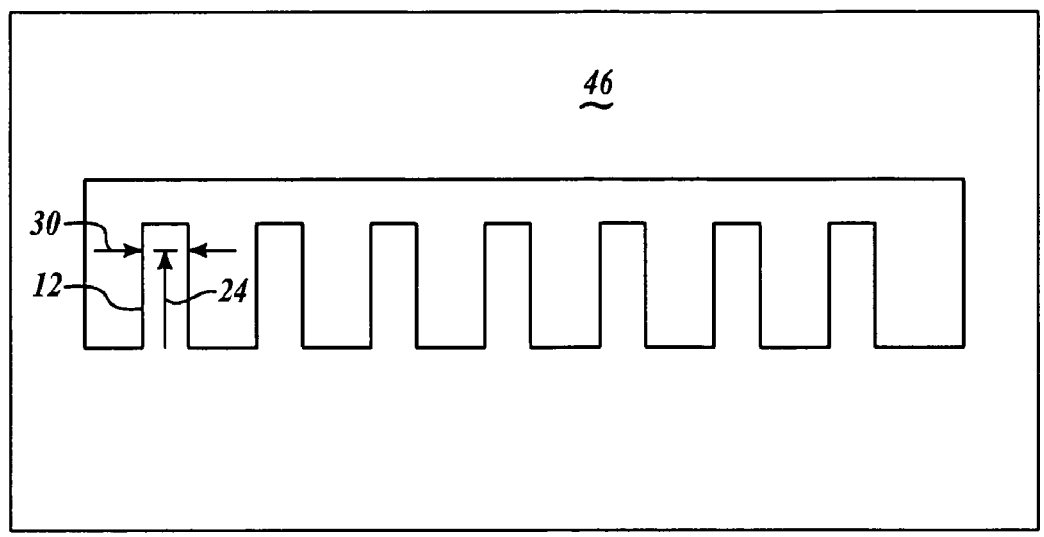
FIG. 4 is a top plan view of a plurality of load beams formed in a silicon wafer, in accordance with an embodiment of the present invention.

Referring to FIG. 4, in some embodiments, the width 30 of the load beam 12 is varied with distance to achieve the desired deflection. Width variations may be accomplished by contouring one or both lateral sides of the load beam 12. In such embodiments, the load beam profile is typically formed in a quartz wafer 46 by photolithography, plasma oxide etching, or like semiconductor forming method. Where a proof mass 20 is used such that inertial forces are exerted primarily at the free end of the load beam, Equation 1 dictates the approximate width of the load beam 12 with distance 24 from the support 22. In Equation 1, and other equations below, B(X) is the width of the load beam with respect to a distance X from the base, F is the characteristic force applied proximate a free end of the load beam 12 by the proof mass 20, L is a total length of the load beam 12 (i.e. the distance from the support 22 to the proof mass 20), E is a modulus of elasticity of the load beam, and H is a height of the load beam.

$$B(x) = \frac{2Fx^2(3L-x)}{EH^3\left((L^2-x^2)^{\frac{1}{2}}-L\right)} \qquad \text{Equation 1}$$

In embodiments where the inertial forces exerted on the mass of the load beam 12 itself or a distributed load are used to detect acceleration, the width is calculated according to Equation 2, where P is equal to the amount of inertial force per unit length along the load beam 2.

$$B(x) = \frac{Px^2(6L^2-4xL+x^2)}{(2EH^3)\left((L^2-x^2)^{\frac{1}{2}}-L\right)} \qquad \text{Equation 2}$$

Figure 5:
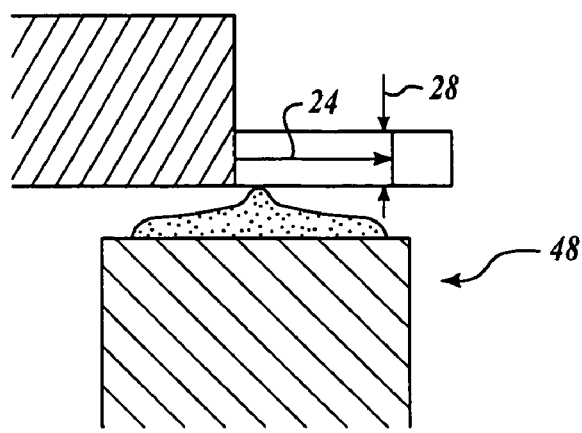
FIG. 5 is a side view of a load beam undergoing magnetorheological finishing, in accordance with an embodiment of the present invention.

Referring to FIG. 5, in some embodiments, the height 28 of the load beam 12 is varied to achieve radial deflection. The height 28 may be varied by contouring one of the top and bottom sides or both. Variations in height may be accomplished by means of a magnetorheological finishing (MRF) apparatus 48 programmed to dwell over portions of the load beam 12 to remove material such that the desired height profile is formed. Alternatively, a diamond saw, or like cutting tool may also be used. In such embodiments, the height 28 varies with distance 24 from the support 22 according to Equation 3, wherein H(X) is the height 28 of the load beam with respect to a distance X from the support 22, B is the width 30, and F is the inertial force exerted by the proof mass 20.

$$H(x) = \left(\frac{2Fx^2(3L-x)}{EB\left((L^2-x^2)^{\frac{1}{2}}-L\right)}\right)^{\frac{1}{3}} \qquad \text{Equation 3}$$

In embodiments where the mass of the load beam 12 itself is used to detect inertial forces or a distributed load is used, the height 28 is calculated according to Equation 4.

$$H(x) = \left(\frac{Px^2(6L^2-4xL+x^2)}{2EB\left((L^2-x^2)^{\frac{1}{2}}-L\right)}\right)^{\frac{1}{3}} \qquad \text{Equation 4}$$

The foregoing equations assume the following:
Radial deflection, Y(X) of the load beam 12 is determined by the equation $$Y(x) = (L^2-x^2)^{\frac{1}{2}}-L$$

The moment of inertia, I, of the load beam 12 is calculated according to the equation $$I = \frac{BH^3}{12}.$$

Deflection, Y(X) in the load beam 12 is a function of the moment of inertia, I, for point loads F, such as those imposed by the proof mass 20 of FIG. 1, imposed a distance L from the support of a cantilever beam is described by the equation $$Y(x) = \frac{Fx^2(3L-x)}{6EI}.$$

Deflection, Y(X) in the load beam 12 as a function of the moment of inertia, I, for distributed load P, such as the inertial force exerted on a load beam 12 without a proof mass 20 shown in FIG. 4, is described by the equation $$Y(x) = \frac{Px^2(6L^2 - 4xL + x^2)}{24EI}.$$

The foregoing equations are illustrative of one method of determining a profile for a load beam 12 having substantially radial deflection. Other methods including computer modeling and experimentation may be used to determine profiles providing radial deflection under a particular load. Radial deflection may also be made by varying both width and height. The basic shape of the cross section may be square, rectangular, or any other shape providing radial deflection.

Figure 6:
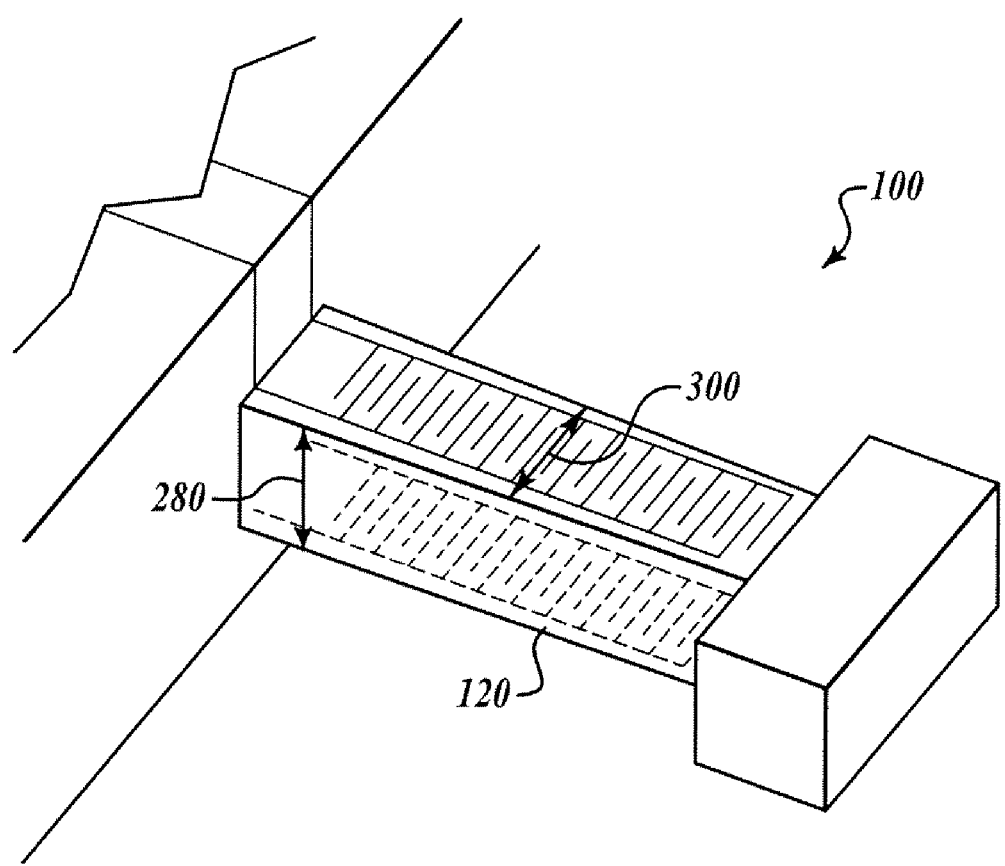
FIG. 6 is a perspective view of a SAW accelerometer formed in accordance with an embodiment of the present invention.

FIG. 6 is a perspective view of a SAW accelerometer 100 formed in accordance with a method of the present invention. The accelerometer 100 includes load beam 120 as a varying cross-section (width 300, height 280) that varies along the longitudinal axis of the load beam 120.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the Claims that follow.

What is claimed is:

1. A surface acoustic wave (SAW) accelerometer comprising:
 a signal processor;
 a base;
 a load beam secured to the base at a proximal end thereof and extending in a longitudinal direction away therefrom, the load beam having a cross section varying in the longitudinal direction to cause the load beam to deflect substantially radially in response to a load imposed thereon; and
 an interdigital transducer (IDT) secured to the load beam and electrically coupled to the signal processor.

2. The SAW accelerometer of claim 1, wherein the cross section has a height varying in the longitudinal direction.

3. The SAW accelerometer of claim 1, wherein the cross section has a width varying in the longitudinal direction.

4. The SAW accelerometer of claim 1, wherein a height of the load beam varies substantially according to the equation $$H(x) = \left( \frac{2Fx^2(3L-x)}{EB\left((L^2-x^2)^{\frac{1}{2}} - L\right)} \right)^{\frac{1}{3}},$$

where H(X) is the height of the load beam with respect to a distance X from the base, F is a force applied proximate the distal end of the load beam, L is a total length of the load beam, E is a modulus of elasticity of the load beam, and B is a width of the load beam.

5. The SAW accelerometer of claim 1, wherein a width of the load beam varies substantially according to the equation $$B(x) = \frac{2Fx^2(3L-x)}{EH^3\left((L^2-x^2)^{\frac{1}{2}} - L\right)},$$

where B(X) is the width of the load beam with respect to a distance X from the base, F is a force applied proximate a distal end of the load beam, L is a total length of the load beam, E is a modulus of elasticity of the load beam, and H is a height of the load beam.

6. The SAW accelerometer of claim 1, wherein a height of the load beam varies substantially according to the equation $$H(x) = \left( \frac{Px^2(6L^2 - 4xL + x^2)}{2EB\left((L^2-x^2)^{\frac{1}{2}} - L\right)} \right)^{\frac{1}{3}},$$

where H(X) is the height of the load beam with respect to a distance X from the base, P is a force applied per unit length of the load beam, L is a total length of the load beam, E is a modulus of elasticity of the load beam, and B is a width of the load beam.

7. The SAW accelerometer of claim 1, wherein a width of the load beam varies substantially according to the equation $$B(x) = \frac{Px^2(6L^2 - 4xL + x^2)}{(2EH^3)\left((L^2-x^2)^{\frac{1}{2}} - L\right)},$$

where B(X) is the width of the load beam with respect to a distance X from the base, P is a force applied per unit length along the load beam, L is a total length of the load beam, E is a modulus of elasticity of the load beam, and H is a height of the load beam.

8. A method for forming a surface acoustic wave (SAW) accelerometer comprising:
 determining a characteristic acceleration;
 determining a characteristic load corresponding to the characteristic acceleration;
 calculating a load beam cross section profile effective to cause radial deflection of a load beam in response to application of the characteristic load;
 forming the load beam based on the load beam cross section profile; and
 securing at least one transducer to the load beam.

9. The method of claim 8, wherein calculating the load beam cross section profile comprises calculating a cross section having a constant width and a height varying in the longitudinal direction.

10. The method of claim 8, wherein calculating the load beam cross section profile comprises calculating a cross section having a constant height and a width varying in the longitudinal direction.

11. The method of claim 8, wherein calculating the load beam profile comprises calculating a height varying in the longitudinal direction substantially according to the equation $$H(x) = \left( \frac{2Fx^2(3L-x)}{EB\left((L^2-x^2)^{\frac{1}{2}} - L\right)} \right)^{\frac{1}{3}},$$

where H(X) is the height of the load beam with respect to a distance X from the base, F is the characteristic load applied proximate the distal end of the load beam, L is a total length of the load beam, E is a modulus of elasticity of the load beam, and B is a width of the load beam.

12. The method of claim 8, wherein calculating the load beam profile comprises calculating a width varying in the longitudinal direction substantially according to the equation $$B(x) = \frac{2Fx^2(3L - x)}{EH^3\left((L^2 - x^2)^{\frac{1}{2}} - L\right)},$$

where B(X) is the width of the load beam with respect to a distance X from the base, F is the characteristic load applied proximate a distal end of the load beam, L is a total length of the load beam, E is a modulus of elasticity of the load beam, and H is a height of the load beam.

13. The method of claim 8, wherein calculating the load beam profile comprises calculating a height varying in the longitudinal direction substantially according to the equation $$H(x) = \left(\frac{Px^2(6L^2 - 4xL + x^2)}{2EB\left((L^2 - x^2)^{\frac{1}{2}} - L\right)}\right)^{\frac{1}{3}},$$

where H(X) is the height of the load beam with respect to a distance X from the base, P is the characteristic load expressed as a force per unit length along the load beam, L is a total length of the load beam, E is a modulus of elasticity of the load beam, and B is a width of the load beam.

14. The method of claim 8, wherein calculating the load beam profile comprises calculating a width varying in the longitudinal direction substantially according to the equation $$B(x) = \frac{Px^2(6L^2 - 4xL + x^2)}{(2EH^3)\left((L^2 - x^2)^{\frac{1}{2}} - L\right)},$$

where B(X) is the width of the load beam with respect to a distance X from the base, P is the characteristic load expressed as a force per unit length along the load beam, L is a total length of the load beam, E is a modulus of elasticity of the load beam, and H is a height of the load beam.

15. A method for sensing acceleration comprising:
   substantially radially deflecting a load beam secured at a proximal end thereof to a base and extending in a longitudinal direction away therefrom, the load beam having a cross section varying in the longitudinal direction to cause the load beam to deflect substantially radially in response to a load imposed thereon;
   calculating an acceleration corresponding to the output of an interdigital transducer (IDT) secured to the load beam.

16. The method of claim 15, wherein a height of the load beam varies substantially according to the equation $$H(x) = \left(\frac{2Fx^2(3L - x)}{EB\left((L^2 - x^2)^{\frac{1}{2}} - L\right)}\right)^{\frac{1}{3}},$$

where H(X) is the height of the load beam with respect to a distance X from the base, F is a force applied proximate the distal end of the load beam, L is a total length of the load beam, E is a modulus of elasticity of the load beam, and B is a width of the load beam.

17. The method of claim 15, wherein a width of the load beam varies substantially according to the equation $$B(x) = \frac{2Fx^2(3L - x)}{EH^3\left((L^2 - x^2)^{\frac{1}{2}} - L\right)},$$

where B(X) is the width of the load beam with respect to a distance X from the base, F is a force applied proximate a distal end of the load beam, L is a total length of the load beam, E is a modulus of elasticity of the load beam, and H is a height of the load beam.

18. The method of claim 15, wherein a height of the load beam varies substantially according to the equation $$H(x) = \left(\frac{Px^2(6L^2 - 4xL + x^2)}{2EB\left((L^2 - x^2)^{\frac{1}{2}} - L\right)}\right)^{\frac{1}{3}},$$

where H(X) is the height of the load beam with respect to a distance X from the base, P is a force applied per unit length of the load beam, L is a total length of the load beam, E is a modulus of elasticity of the load beam, and B is a width of the load beam.

19. The method of claim 15, wherein a width of the load beam varies substantially according to the equation $$B(x) = \frac{Px^2(6L^2 - 4xL + x^2)}{(2EH^3)\left((L^2 - x^2)^{\frac{1}{2}} - L\right)},$$

where B(X) is the width of the load beam with respect to a distance X from the base, P is a force applied per unit length along the load beam, L is a total length of the load beam, E is a modulus of elasticity of the load beam, and H is a height of the load beam.

20. An apparatus for forming a surface acoustic wave (SAW) accelerometer comprising:
   a means for determining a characteristic acceleration;
   a means for determining a characteristic load corresponding to the characteristic acceleration;
   a means for calculating a load beam cross section profile effective to cause radial deflection of a load beam in response to application of the characteristic load;
   a means for forming the load beam having the load beam cross section profile; and
   a means for securing a transducer to the load beam.

* * * * *